UNITED STATES PATENT OFFICE.

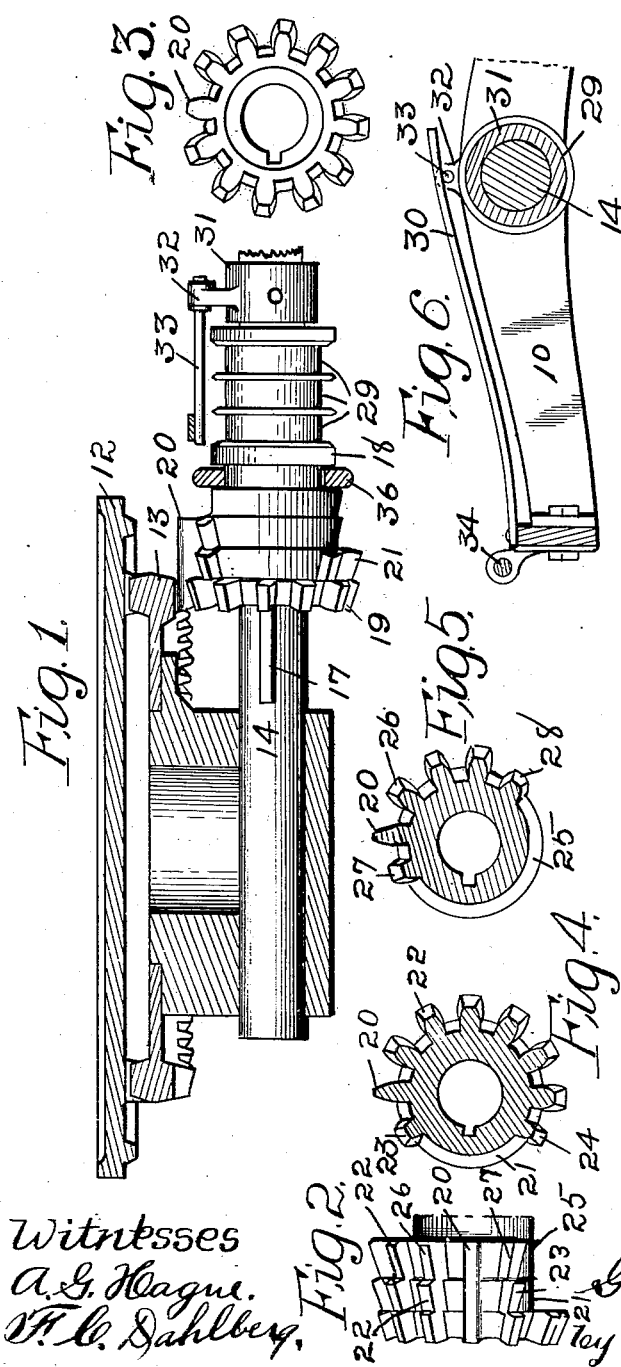

GEORGE H. YOUNG, OF DES MOINES, IOWA.

CORN-PLANTER.

No. 915,148.　　　　Specification of Letters Patent.　　Patented March 16, 1909.

Application filed August 10, 1908. Serial No. 447,691.

*To all whom it may concern:*

Be it known that I, GEORGE H. YOUNG, a citizen of the United States, residing at Des Moines, in the county of Polk and State of Iowa, have invented a certain new and useful Improvement in Corn-Planters, of which the following is a specification.

My invention is particularly designed to be used in connection with that type of corn planters which are used in connection with a check wire stretched across a field and which are provided with seed dropping plates arranged to drop the seeds one at a time into the planter leg.

My object is to provide means of simple, durable, and inexpensive construction whereby the operator riding upon the machine may quickly and easily adjust the device so that any desired number of seeds may be dropped into the planter leg between the hills, which adjustment may be made during the time the machine is being advanced across a field, so that when the planter is being advanced over comparatively rich ground a large number of seeds may be dropped in each hill, and when passing over poor ground a less number may be dropped, all of which may be done without stopping the machine or in any way affecting the accuracy of the check rows made by the machine.

More specifically it is my object to provide a device of this kind in which the seed dropping mechanism is constantly maintained to work at the proper time for dropping seeds in the hills equally spaced apart without regard to the shifting of the gearing devices, so that no matter how many times the gearing devices are changed during the time the planter is traveling from one end of a row to the other, the seed dropping mechanism will be operated by any one of the gears to complete the dropping of seeds at the proper time for depositing the seeds in the next hill.

A further object is to provide means whereby the shifting of the gearing devices may be accomplished only at such a portion of the movement of the gearing devices that the accurate timing of the seed dropping devices will not be interfered with by said shifting movement.

My invention consists in the construction, arrangement and combination of the various parts of the device whereby the objects contemplated are attained, as hereinafter more fully set forth, pointed out in my claims, and illustrated in the accompanying drawings, in which—

Figure 1 shows an enlarged, detail sectional view through a portion of the seed dropping device with my improved adjustable gearing device in position adjacent thereto. Fig. 2 shows a plan view of the gearing device for operating the seed dropping plate. Fig. 3 shows an end view of the first beveled gear to the left, and Figs. 4 and 5, respectively, show sectional views through the central and right beveled gears. Fig. 6 shows an enlarged, detail view partly in section illustrating the spring for preventing longitudinal movement of the gearing devices at certain times in their movement, and Fig. 7 shows a top or plan view of part of a planter with my improvements applied thereto.

Referring to the accompanying drawings, I have used the reference numeral 10 to indicate that part of the planter frame shown, 11 indicates the seed boxes, and 12, the seed dropping plate at the bottom of a seed box. This plate is actuated by means of a beveled gear wheel 13.

14 indicates a shaft operated by power from a supporting wheel not shown through the sprocket gearing device 15. The means for turning the beveled gear wheel 13 from the shaft 14 will be hereinafter more fully described.

The numeral 16 indicates the usual forked lever to be actuated by a check wire for the purpose of dropping seeds.

All of the parts above described are of the ordinary construction, now in general use, and hence, it is not necessary herein to specifically describe the construction and operation thereof.

The shaft 14 is provided with a spline 17 and mounted upon said shaft is a hub 18 having a notch therein to receive the spline, so that the hub is capable of longitudinal movement on the shaft. Formed on or fixed to this hub are the following devices: Beginning at the left end of the hub is a small beveled pinion 19 having teeth extending all around its periphery. One of said teeth which is indicated by the numeral 20 extends through the right side of the beveled pinion 19 and projects a considerable distance beyond said pinion, for purposes hereinafter made clear. Adjacent to the beveled pinion 19 is a beveled pinion 21 having full sized teeth 22 extending about half way around its periphery, beginning at the tooth 20. On the side of the tooth 20 opposite from the teeth 22 is a single short tooth 23 and at the end of the row of teeth 22 on the opposite side of the tooth 20 is a single short tooth 24. At the side of the beveled pinion 21 is a third beveled pinion 25 having on one side of the tooth 20 a number of full sized teeth 26 extending about one-fourth of the distance of the circumference of the pinion and on the opposite side of the tooth 20 is a short tooth 27 and at the end of the row of teeth 26 is a second short tooth 28. Means are provided as will hereinafter appear for shifting the hub 18 so that any one of said beveled pinions, 19, 21 and 25, will be in mesh with the beveled pinion 13.

The beveled pinion 19 being provided with teeth all around its periphery will obviously run in mesh with the cog wheel 13 without danger of moving out of unison with it. However, when either of the other pinions 21 and 25 is in mesh with the pinion 13, then at the points on said pinions where there are no teeth, it is possible that they will move the pinion 13 slightly less or greater distances than desired, and hence, the accurate timing of the pinion 13 with relation to the shaft 14 might be affected. I, therefore, provide means whereby all of the shifting of the hub 18 shall be done at the time when the tooth 20 is in mesh with the pinion 13. This means will be fully described hereinafter.

I have found that, by using full sized teeth on the pinions 21 and 25 with short teeth at the end of the rows of long teeth, I can cause the pinion 13 to be moved exactly the right distance during part of the movement of the shaft 14 and then stop during the other part, so that the seed dropping plate 12 will drop the pre-determined number of seeds. I have also found that, by placing one of the short teeth on the side of the long tooth 20 that is opposite from the row of full sized teeth, I can cause the pinion 13 to be moved to exactly the desired position at the time when the tooth 20 is in mesh with the pinion 13. In the accompanying illustration, I have shown the pinion 19 provided with twelve full sized teeth, the pinion 21 with seven full sized teeth and two short ones, and the pinion 25 with four full sized teeth and two short ones.

Assuming that the beveled pinion 13 and the seed-dropping plate 12 are so arranged and proportioned that four grains of corn will be dropped by the seed-dropping plate during the time that the beveled pinion 13 is moved the distance of twelve tooth spaces, then when the beveled pinion 21 is in mesh with the pinion 13, I have found that it will move the pinion 13 exactly three-fourths of the distance that it is moved by the beveled pinion 19. This result, I have found cannot be accomplished by the use of a beveled pinion containing nine full sized teeth for the reason that the full sized teeth at the ends of the row begin to act upon the teeth of the pinion 13 too early in the movement and continue to act too late. However, by providing seven full sized teeth and two short ones I can thereby drive the pinion 13 exactly three-fourths the distance that it would be driven by the pinion 19.

Assuming that the pinion 25 is in mesh with the pinion 13, the result will be that the pinion 13 is driven just one-half the distance that it would be driven by the pinion 19 for the reasons above set forth, hence, by the arrangement and combination shown, and assuming that during the passage of a machine across a field all of the pinions 19, 21 and 25 are successively thrown into engagement with the pinion 13, then at the end of the row it will be found that the seed dropping plate is accurately timed, that is to say, it will drop four seeds in each hill when the pinion 19 is in mesh, three seeds when the pinion 21 is in mesh, and two seeds when the pinion 25 is in mesh.

In order that the shifting of the hub 18 may always be accomplished when the tooth 20 is in mesh with the beveled pinion 13, and at no other time, I have provided on the hub 18 a series of annular grooves 29, one for each beveled pinion. Fixed to the part of the frame adjacent thereto is a flat spring 30 normally resting in one of said grooves 29. Fixed to the shaft 14 adjacent to the grooves 29 is a collar 31 having an arm 32 thereon provided with a pin 33 projecting over the grooves 29. This pin 33 is substantially in alinement with the long tooth 20. The said pin 33 operates between the hub 18 and the spring 30 and said parts are so arranged and disposed that when the pin 33 and the tooth 20 are at the upper portion of their stroke, as illustrated in Figs. 1 and 6, then the pin holds the spring out of said groove, but when said pin and tooth are at any other portion of their movement, the spring is in the groove and the hub 18 is thereby prevented from longitudinal movement. Hence, when the said hub is shifted so that one of the beveled pinions is placed in mesh with the beveled pinion 13, it is the tooth 20 that is in contact with the tooth of the beveled pinion 13, hence, the shifting may be done easily and it cannot be done at the time when the blank parts of either of the beveled pinions 21 and 25 are in position adjacent to the beveled pinion 13.

In order to operate both seed dropping devices of the planter at the same time, I provide a slide-rod 34 connected with a lever 35 and having at each end an arm 36 mounted in a groove in the hub 18, so that a longitudinal movement of said rod 34 will operate both of the hubs 18 at the same time.

I claim as my invention.

1. In a device of the class described, the combination of a seed dropping plate, a pinion connected therewith, a rotatable shaft, a number of pinions on the rotatable shaft designed to be successively brought into engagement with the pinion of the seed dropper, said pinions on the shaft being provided with different numbers of teeth, and a single tooth extending across each of said pinions and forming one of the teeth of each pinion, whereby the pinions on the shaft may be readily and easily shifted during the time that said single tooth is in mesh with the pinion on the seed-dropper.

2. In a device of the class described, the combination of a seed dropping plate, a beveled pinion connected therewith, a shaft, a series of beveled pinions slidingly mounted on the shaft and having different numbers of teeth, and a single straight tooth extended over all of said pinions on the shaft and forming one of the teeth of each pinion for the purposes stated.

3. In a device of the class described, the combination of a seed dropping plate, a beveled pinion connected therewith, a shaft, a series of beveled pinions slidingly mounted on the shaft and having different numbers of teeth, and a single straight tooth extended over all of said pinions on the shaft and forming one of the teeth of each pinion, and means for permitting longitudinal movement of the series of beveled pinions at the time when the said long tooth is in mesh with the beveled pinion on the seed dropping plate, said means also preventing the shifting of the beveled gears at other times.

4. In a device of the class described, the combination of a seed dropping plate, a pinion connected therewith, a rotatable shaft, a number of pinions on the rotatable shaft designed to be successively brought into engagement with the pinion of the seed dropper, said pinions on the shaft being provided with different numbers of teeth, and a single tooth extending across each of said pinions and forming one of the teeth of each pinion, whereby the pinions on the shaft may be readily and easily shifted during the time that said single straight pinion is in mesh with the pinion on the seed-dropper, and means for permitting longitudinal movement of the series of beveled pinions at the time when the said long tooth is in mesh with the beveled pinion on the seed dropping plate, said means also preventing the shifting of the beveled gears at other times.

5. In a device of the class described, the combination of a seed dropping plate, a pinion connected therewith, a rotatable shaft, a series of pinions on the rotatable shaft, said pinions having different numbers of teeth thereon, the teeth at the ends of the row on each pinion being of shorter length than the other teeth for the purposes stated.

6. In a device of the class described, the combination of a seed dropping plate, a pinion connected therewith, a rotatable shaft, a series of pinion on the rotatable shaft, said pinions having different numbers of teeth thereon, the teeth at the ends of the row on each pinion being of shorter length than the other teeth, and a single straight tooth extended across all of said pinions on the shaft and forming one of the teeth for each pinion, said single straight tooth being so positioned on the pinions that have less than a full number of teeth that it will be the last full sized tooth at one end of the row on each of said pinions, and between the short tooth at one end of the row and the adjacent full sized teeth for the purposes stated.

7. In a device of the class described, the combination of a seed dropping plate, a beveled pinion connected therewith, a shaft, a hub slidingly mounted upon the shaft and having formed thereon, three beveled pinions, one of said pinions being provided with teeth all around its periphery and the others with less numbers of teeth, said hub having three annular grooves formed therein, a spring fixed to the stationary support and designed to rest in any one of said grooves, and a rotatable pin carried by the shaft and designed to engage said spring and to hold it out of the grooves at a certain period during the rotation of the beveled pinions, for the purposes stated.

8. In a device of the class described, the combination of a seed dropping plate, a beveled pinion connected therewith, a rotatable shaft, a hub slidingly mounted thereon, means for longitudinally moving the hub, a series of pinions formed on the hub, each having a different number of teeth thereon, said pinions also being provided with one straight tooth common to all of them and forming one of the teeth of each pinion, said hub being also formed with an annular groove for each pinion, a spring fixed at one end to a stationary support and designed to enter any one of said grooves, an arm fixed to the shaft in position in line with the said straight tooth, said arm being projected over said annular grooves, and so positioned as to elevate the spring out of the annular groove in which it is resting when the said straight tooth is in position in engagement with the beveled pinion of the seed dropping plate.

Des Moines, Iowa, July 30, 1908.

GEORGE H. YOUNG.

Witnesses:
 RALPH ORWIG,
 MILDRED B. GOLDIZEN.